United States Patent
Beck (10) Patent No.: US 9,038,734 B1
(45) Date of Patent: *May 26, 2015

(54) UNDERWATER OIL AND GAS LEAK CONTAINMENT SYSTEMS AND METHODS

(71) Applicant: Jeffrey L. Beck, Centerfield, UT (US)

(72) Inventor: Jeffrey L. Beck, Centerfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,633

(22) Filed: Nov. 17, 2014

Related U.S. Application Data (63) Continuation-in-part of application No. 13/172,674, filed on Jun. 29, 2011, now Pat. No. 8,887,813.

(60) Provisional application No. 61/361,379, filed on Jul. 2, 2010.

(51) Int. Cl.
*E21B 43/01* (2006.01)

(52) U.S. Cl.
CPC .................................. *E21B 43/0122* (2013.01)

(58) Field of Classification Search
CPC ...... E21B 43/0122; F15C 1/16; F15D 1/0015
USPC ............... 166/357, 364, 75.12; 137/808, 812; 406/93
See application file for complete search history.

(56) References Cited

U.S. PATENT DOCUMENTS

| | | | | |
|---|---|---|---|---|
| 4,227,863 A | * | 10/1980 | Sommerer | 417/169 |
| 4,409,746 A | * | 10/1983 | Beck | 37/317 |
| 4,449,862 A | * | 5/1984 | Beck | 406/93 |
| 4,563,123 A | | 1/1986 | Beck | |
| 4,597,859 A | | 7/1986 | Beck | |
| 7,144,503 B2 | * | 12/2006 | Oserod | 210/221.2 |
| 7,520,989 B2 | * | 4/2009 | Ostergaard | 210/512.1 |
| 7,534,354 B2 | * | 5/2009 | Oserod | 210/703 |
| 8,220,551 B2 | * | 7/2012 | Fenton | 166/357 |
| 8,887,813 B2 | * | 11/2014 | Beck | 166/357 |
| 2007/0277967 A1 | * | 12/2007 | Oserod | 166/75.12 |

\* cited by examiner

*Primary Examiner* — Matthew Buck
(74) *Attorney, Agent, or Firm* — Warren M. Pate; Pate Peterson, PLLC

(57) ABSTRACT

A system and method are disclosed for containing an underwater gas or oil leak. The system and method may include a vortex device comprising a vortex chamber, a high pressure inlet tangentially engaging the vortex chamber, a low pressure inlet axially engaging the vortex chamber, and a low pressure outlet axially engaging the vortex chamber opposite the low pressure inlet. The vortex device may be positioned underwater proximate an underwater leak. A vortex may be generated within the vortex device. The vortex device may then collect a leak flow issuing from the underwater leak. The vortex device may collect the leak flow via the low pressure inlet, the high pressure inlet, or both.

20 Claims, 8 Drawing Sheets

UNDERWATER OIL AND GAS LEAK CONTAINMENT SYSTEMS AND METHODS

RELATED APPLICATIONS

This application is a continuation-in-part of U.S. patent application Ser. No. 13/172,674 filed Jun. 29, 2011, which claims the benefit of U.S. Provisional Patent Application Ser. No. 61/361,379 filed Jul. 2, 2010. Both U.S. patent application Ser. No. 13/172,674 and U.S. Provisional Patent Application Ser. No. 61/361,379 are hereby incorporated by reference.

BACKGROUND

1. The Field of the Invention

This invention relates to containment systems and, more particularly, to novel systems and methods for containing underwater gas and oil leaks.

2. The Background Art

As evidenced recently in the Gulf of Mexico, it is difficult to contain a gas and oil leak located deep underwater. It is particularly difficult when uncontrolled adiabatic expansion makes the gas very cold. Accordingly, what is needed is a system and method that addresses the unique challenges of containing a gas and oil leak located deep underwater.

BRIEF SUMMARY OF THE INVENTION

In view of the foregoing, in accordance with the invention as embodied and broadly described herein, methods and apparatus are disclosed as including a vortex device comprising a vortex chamber containing a vortex rotating therewithin. A vortex chamber may have a relative high pressure at the perimeter of a vortex contained therewithin and a relative low pressure near the center of the vortex. By having different diameter openings at the center of the vortex chamber, a flow may be induced through the center of the vortex. This flow may enter at a smaller, low pressure, axial inlet and leave via a larger, low pressure, axial outlet due to the pressure gradient within the vortex.

In certain embodiments, to generate a vortex within a vortex chamber, a vortex device may include a high pressure inlet and, optionally, a high pressure outlet. A high pressure inlet may direct a driving fluid tangentially into a vortex chamber to inducing rotation of the fluid therewithin.

In selected embodiments, a vortex device may be configured to execute an axial inlet method to contain an underwater gas and oil leak. This method may use induced flow into the center of the vortex chamber (e.g., via a low pressure inlet). The main objective in this embodiment may be to induce and maintain a flow of mixed diluent and recovered oil and gas out the low pressure axial outlet that does not freeze as it rises within piping to the surface. Accordingly, this method may be the most robust approach for very extreme conditions where there is a lot of cold gas.

In selected alternative embodiments, a vortex device may be configured to execute a tangential inlet method to contain an underwater gas and oil leak. This method may bring the oil and gas, along with any entrained sea water, into the vortex of a vortex chamber through a tangential high pressure inlet. In such a configuration, the flow into the vortex chamber may be caused by either a negative pressure within the vortex chamber or because a sound mechanical connection has been made to existing sea-floor piping that can withstand a positive pressure.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
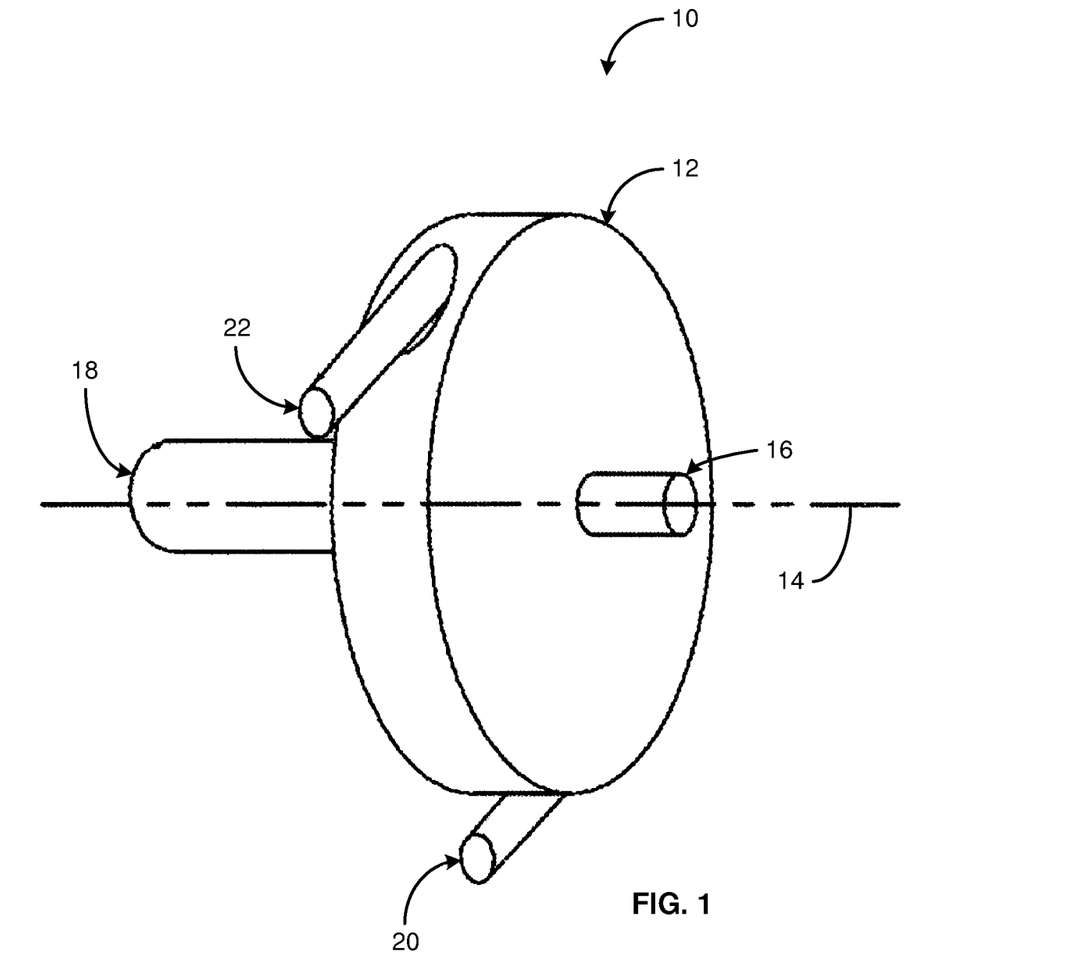
FIG. 1 is a schematic diagram illustrating a vortex chamber in accordance with the present invention.

Referring to FIG. 1, certain devices are disclosed in U.S. Pat. Nos. 4,409,746 and 4,449,862, which patents are hereby incorporate by reference. A vortex device 10 in accordance with the present invention may share certain similarities in structure to those devices, but may be modified or connected or utilized differently to contain an underwater gas and oil leak.

In selected embodiments, a vortex device 10 in accordance with the present invention may include a vortex chamber 12. A vortex chamber 12 may contain a vortex rotating about an axis of rotation 14. A vortex chamber 12 in accordance with the present invention may have a relative high pressure at the perimeter of a vortex contained therewithin and a relative low pressure near the center of the vortex. By having different diameter openings at the center of the vortex chamber 12, a flow may be induced through the center of the vortex (e.g., along the axis of rotation 14). This flow may enter at a smaller, low pressure, axial inlet 16 and leave via a larger, low pressure, axial outlet 18 due to the pressure gradient within the vortex.

To generate a vortex within a vortex chamber 12, a vortex device 10 may include a high pressure inlet 20 and, optionally, a high pressure outlet 22. A vortex chamber 12 may have a generally cylindrical shape. A high pressure inlet 20 may direct a driving fluid tangentially into a vortex chamber 12 to induce rotation of the fluid therewithin. Should a high pressure outlet 22 be included, it may also tangentially engage the vortex chamber 12 and, thereby, remove driving fluid from the vortex chamber 12 without impeding (and potentially aiding) the induced rotation.

There may be no particular water depth limitation for use of a vortex device 10 in accordance with the present invention. In general, a vortex device 10 will work better in deeper water because there are greater differentials in pressure available. The vortex device 10 and associated piping may be selected to withstand the negative pressure at depth urging collapse thereof.

A system in accordance with the present invention may use a vortex together with a diluent of sufficient volume to prevent freezing of any water entrained in the recovery flow. Any suitable process or processes may be employed at the surface to separate the diluent and recover the oil and gas. In certain embodiments, the most economical diluent may be sea water. However, other fluids may be used as the diluent. For example, in selected embodiments, lighter fluids may be used to facilitate separation of oil and gas within the vortex. Fluids having chemical properties that may further reduce the chances of ice or other solids forming on the walls of the vortex chamber and associated piping may also be used as a diluent.

Figure 2:
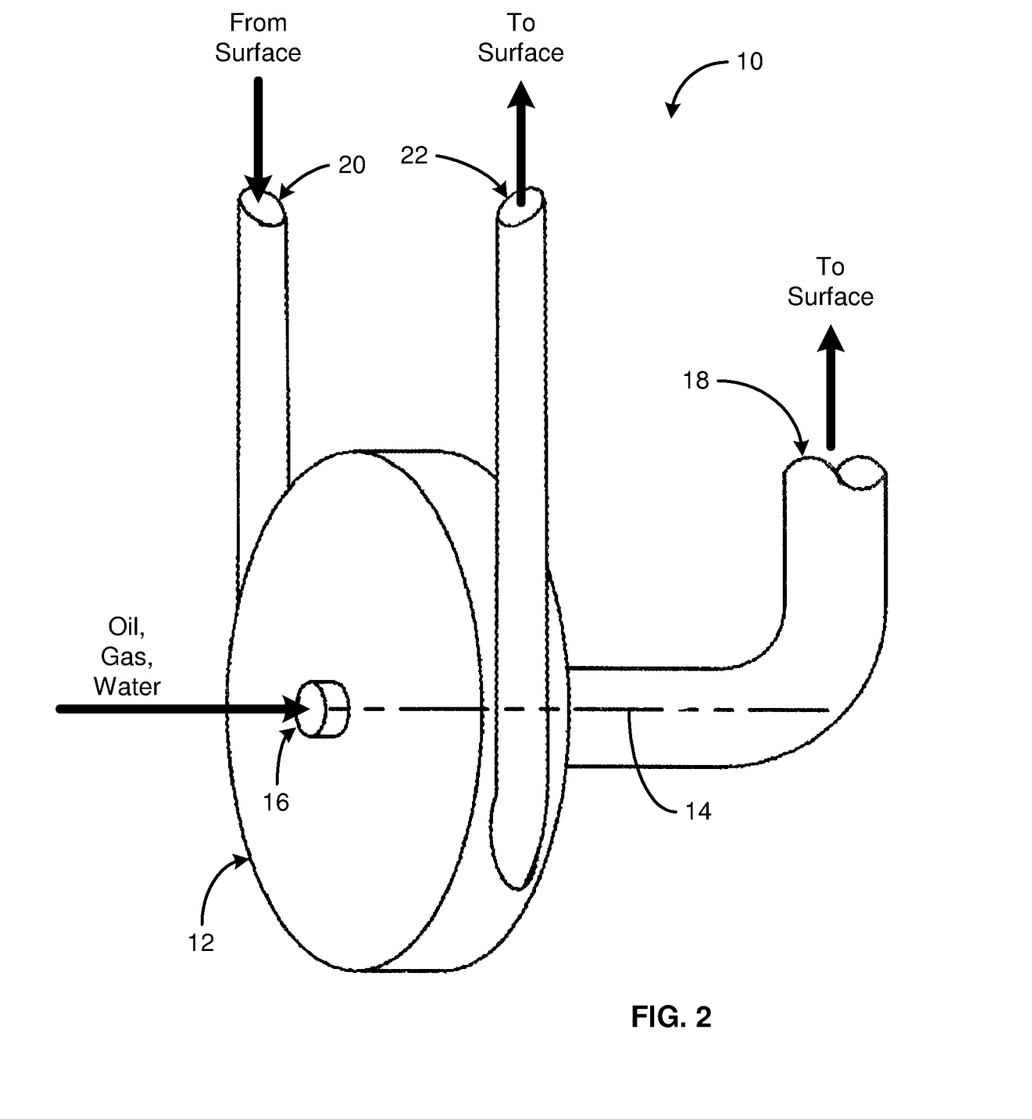
FIG. 2 is a schematic diagram illustrating the vortex chamber of FIG. 1 configured and connected in a first manner in accordance with the present invention to contain an underwater gas and oil leak.

Referring to FIG. 2, in selected embodiments, a vortex device 10 may be configured to execute an axial inlet method to contain an underwater gas and oil leak. This method may use induced flow into the center of a vortex chamber 12. The main objective in this embodiment may be to induce and maintain a flow of mixed diluent and recovered oil and gas out the low pressure axial outlet 18 that does not freeze as it rises within piping to the surface. Accordingly, this method may be the most robust approach for very extreme conditions where there is a lot of cold gas.

In selected embodiments, a flow of oil and gas may enter a vortex within a vortex chamber 12 directly through an axial low pressure inlet 16. The inlet 16 may simply be an opening formed in the wall of the vortex chamber 12 and lack any piping on which ice may form. In this way, any solid formation would be more likely to be entrained in the flow rather than building up on surfaces.

The fluid entering a vortex chamber 12 through a high pressure inlet 20 may come from a surface vessel or platform and be pumped down. The fluid within a high pressure inlet 20 may be sea water recovered from the flow back to the surface. Alternatively, the fluid may be any other fluid deemed appropriate as a driving fluid. The high pressure outlet 22 may be optional, depending upon operating conditions and the fluid being used at the high pressure inlet 20.

Some method of applying back pressure or regulation may be used at the surface vessel or platform. Additionally, regulation of the axial inlet 16 and outlet 18 flows may be implemented using concentrically operating valves on the vortex chamber 12. Any control device that can produce a variable diameter orifice may be used for this regulation, including those that use a thick elastomer with a control fluid behind it to reduce the orifice diameter.

A vortex device 10 in accordance with the present invention may be held in place proximate an underwater leak in any suitable manner. The positioning and orientation of a vortex device 10 may depend on the embodiment and conditions involved. For example, the positioning and orientation may depend on whether the vortex device 10 intakes a leak flow (e.g., oil, gas, or some combination thereof) through a low pressure inlet 16, a high pressure inlet 20, or the like. Suitable mechanisms for positioning or orienting a vortex device 10 may include inherent weight (e.g., the weight of the device 10 itself), one or more external anchors, anchor lines (e.g., cables, chains, etc.), substantially rigid or rigid positioning arms or linkages, brackets, conduits conducting a leak flow into an inlet 16, 20 of a vortex device 10, or the like, or combinations or sub-combinations thereof.

Figure 3:
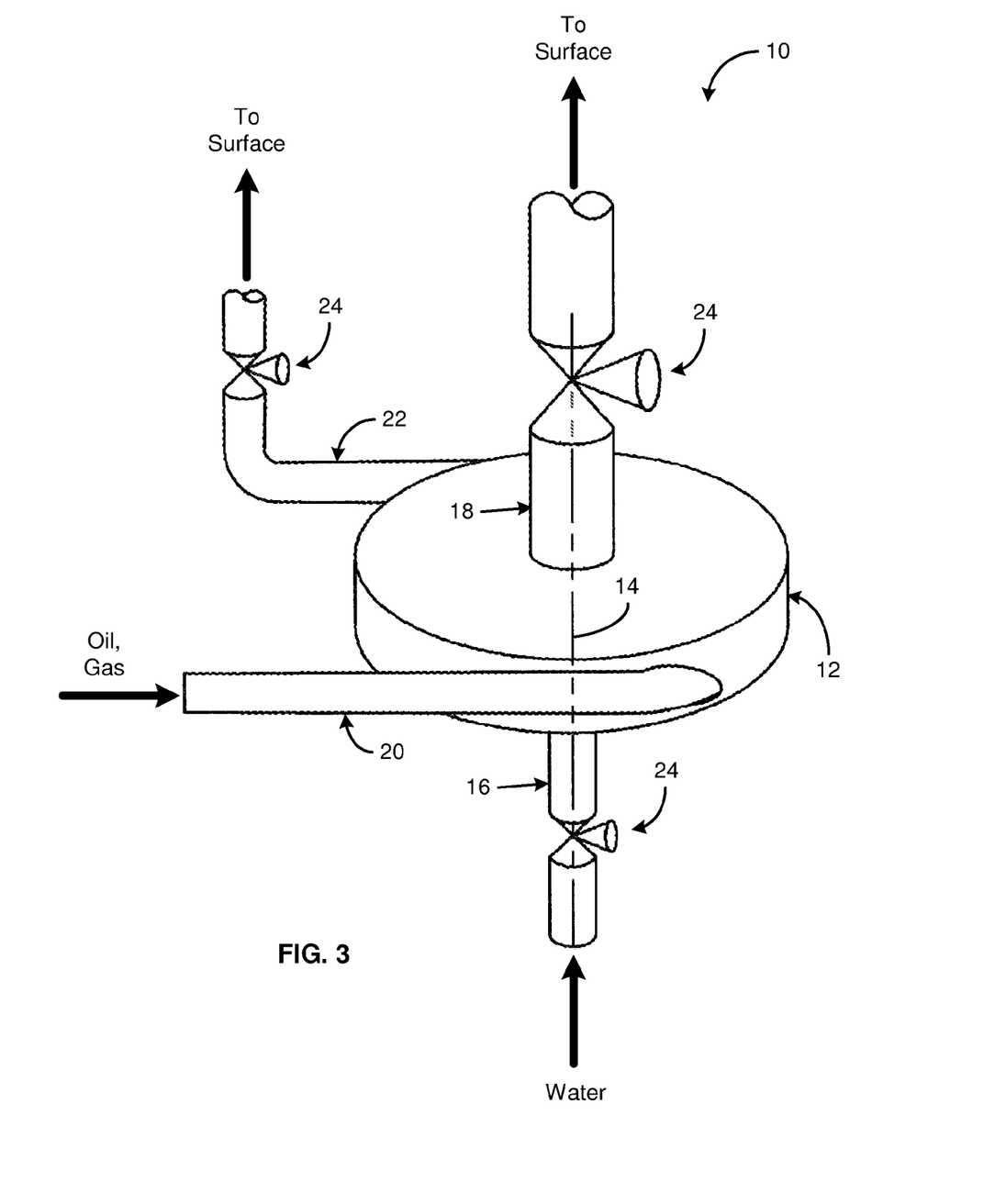
FIG. 3 is a schematic diagram illustrating the vortex chamber of FIG. 1 configured and connected in a second manner in accordance with the present invention to contain an underwater gas and oil leak.

Referring to FIG. 3, in selected alternative embodiments, a vortex device 10 may be configured to execute a tangential inlet method to contain an underwater gas and oil leak. This method may bring the oil and gas, along with any entrained sea water, into the vortex of a vortex chamber 12 through a tangential high pressure inlet 20. In such a configuration, the flow into the vortex chamber 12 may be caused by either a negative pressure within the vortex chamber or because a sound mechanical connection has been made to existing seafloor piping that can withstand a positive pressure.

In the case of negative pressure within the vortex chamber 12, it would be negative because of hydrostatic pressure outside being higher than that inside because of density differences between water, oil, and gas. Conditions may have to be such that any piping forming the tangential inlet 20 would not freeze up.

Once the flow enters the vortex within the vortex chamber 12, the lighter gas may move to the center low pressure region of the vortex, where it may mix with sea water entering the axial inlet 16 of the vortex injector, and then exit through the axial outlet 18 and travel to the surface in piping as a mixture of gas, water and possibly oil, and then connect to a surface vessel or platform for containment and processing. Oil, and possibly water, may exit through the tangential high pressure outlet of the vortex chamber and travel in piping to a surface vessel or platform for containment and processing. However, the use of the tangential high pressure outlet 22 may be optional, depending upon operating conditions.

It may be that if the tangential high pressure outlet 22 is used, an extension pipe through the core of the vortex chamber 12 would be desirable to convey sea water preferentially to the axial outlet 18. This may support entrainment and warming of the gas flow to prevent freezing by mixing sufficient sea water to warm the gas above a freezing temperature.

Various optional control values 24 may be included as desired or necessary. For example, control of the gaseous flow out of the axial outlet 18 to a surface vessel or platform may be desirable. This control may be enforced by surface facilities. Additionally, it may be desirable to regulate flow of sea water into the axial inlet 16. This may be accomplished using annular control valves similar to those discussed above with respect to the axial inlet method, and to control the flow from the tangential outlet 22 to the surface as well.

Referring to FIGS. 1-3, depending upon the head required at the surface, above sea level, it may be necessary to induce flow from the axial outlet 18 and tangential outlet 22 (if any). This may be done by adding a compressed gas (e.g., air) such that it enters the outlet flow stream. It could be added just past the pump supplying the driving tangential inlet flow, or to the axial and tangential outlet flows near the vortex chamber 12. Flow may be induced this way with a single pipeline from the surface (plus a small air/gas line to get it started) connected only to the axial outlet 18. The flows within axial inlet 16 and the tangential inlet 20 may enter at the vortex chamber 12 without a connection to the surface.

In embodiments where the oil and gas are entering the tangential inlet 20, a significant differential pressure across the vortex flow to produce adequate mixing may be created by making the axial inlet 16 quite small, just enough to let in enough water to warm up the mixture and keep it from freezing. In embodiments where the oil and gas are entering at the axial inlet 16, the pipe to the surface may be large enough to carry the leak flow plus a lot more, or there may need to be a fairly tight connection between the axis of the vortex chamber 12 and the leak source such that little water could get in from that direction.

Figure 4:
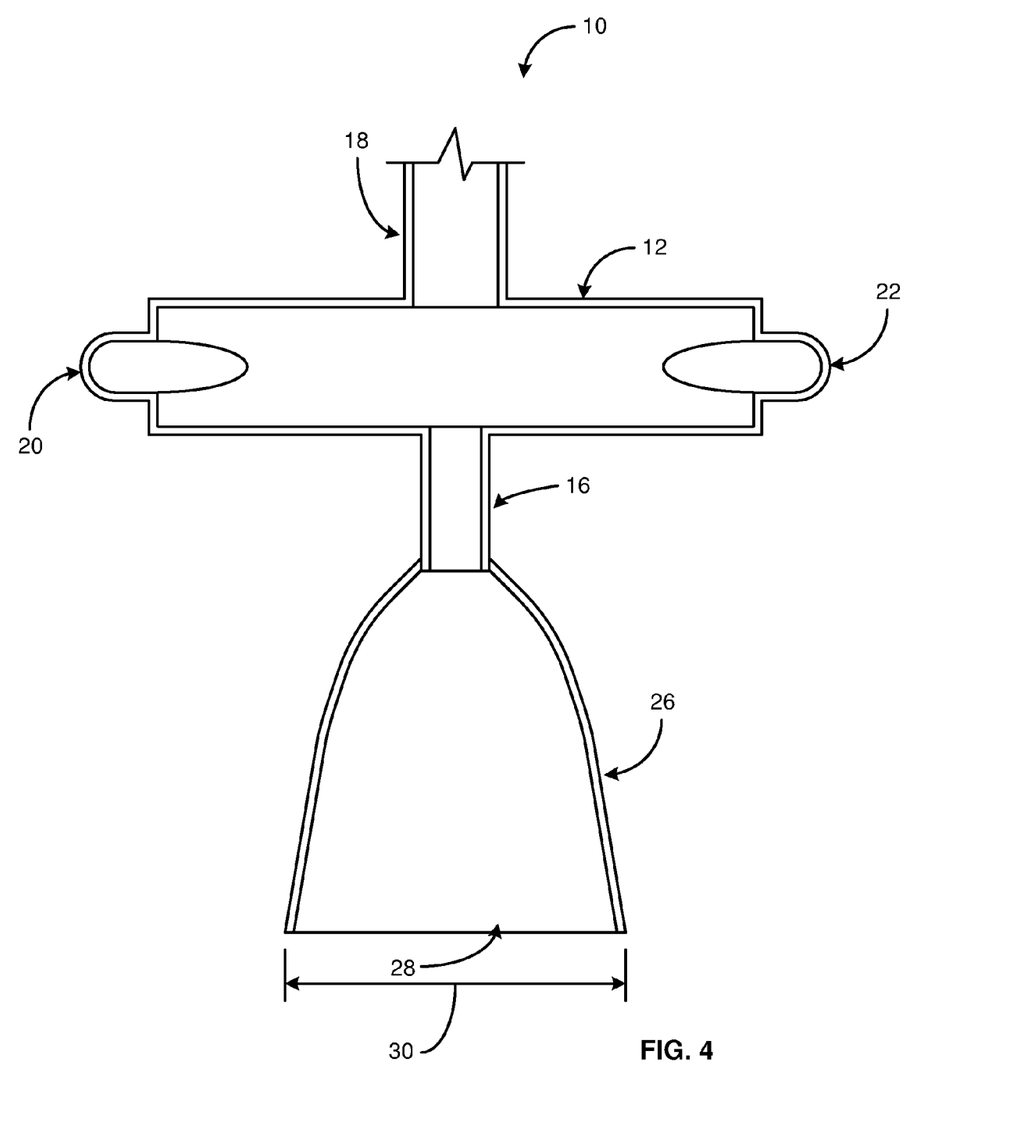
FIG. 4 is a schematic diagram illustrating a vortex chamber with one embodiment of a shroud in accordance with the present invention applied to the axial inlet.
Figure 5:
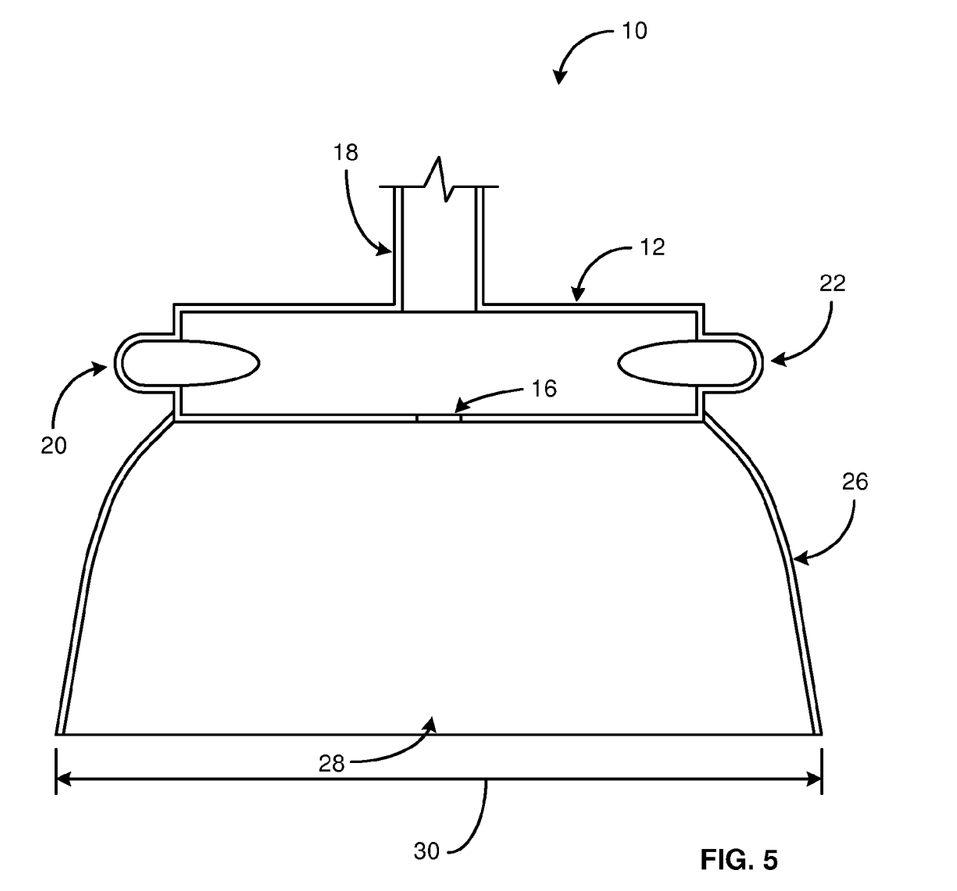
FIG. 5 is a schematic diagram illustrating a vortex chamber with an alternative embodiment of a shroud in accordance with the present invention applied to an exterior of the vortex chamber.
Figure 6:
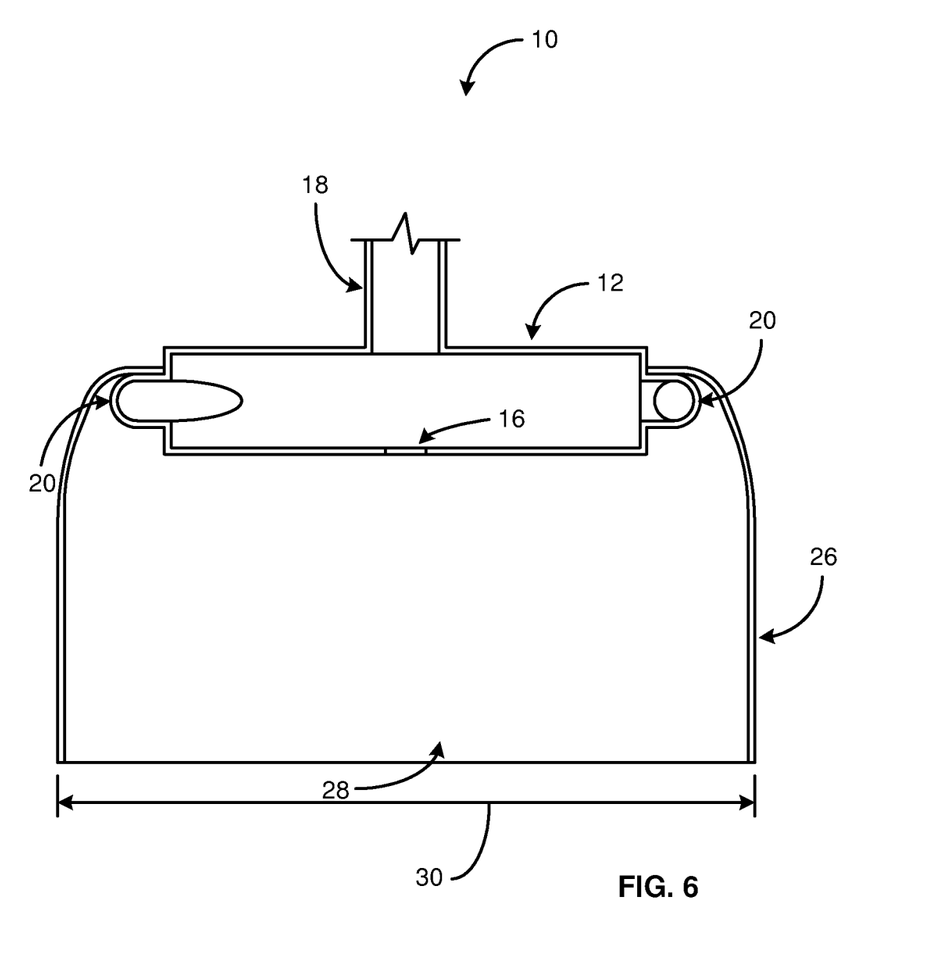
FIG. 6 is a schematic diagram illustrating a vortex chamber with another alternative embodiment of a shroud in accordance with the present invention applied over multiple tangential inlets and the axial inlet.

Referring to FIGS. 4-6, a leak flow may be of a certain size or have a randomness of movement, turbulence, or the like that makes it difficult to collect via a relatively small low pressure inlet 16. In certain situations, it may be undesirable to alleviate this difficulty by increasing the size of the low pressure inlet 16 since doing so would affect the pressure gradient generated within a vortex chamber 12. Accordingly, in selected embodiments, a vortex device 10 in accordance with the present invention may include a shroud 26. A shroud 26 may form an interface between a leak flow and a vortex device 10.

A shroud 26 may have a flared opening 28 having a width 30 or diameter 30 that is significantly greater than that of a low pressure inlet 16. Such an opening 28 may enable a shroud 26 to encircle a leak flow and conduct the leak flow into or toward a low pressure inlet 16. In this manner, the ability of a vortex device 10 to capture a leak flow may be enhanced.

A shroud 26 may be formed of any suitable material or combination of materials. In selected embodiments, a shroud 26 may be formed of or comprise concrete. In other embodiments, a shroud 26 may be formed of metal. For example, a shroud 26 may comprise one or more sheets of metal connected together. Such sheets of metal may have a thickness selected to provide the structural strength required for the shroud 26. Alternatively, a shroud 26 may be formed of relatively thin sheets of metal supported by a frame (e.g., a metal frame).

In certain embodiments, the thickness or mass of a shroud 26 may be selected to provide only the structural strength required to function as a shroud 26. Alternatively, the thickness, mass, or the like may be oversized to enable a shroud 26 to perform additional functions. For example, a shroud 26 may employed as a stand or base for supporting the rest of a vortex device 10 in a desired positioned with respect to a leak flow. Accordingly, a shroud 26 may have a strength, mass, and the like to enable the shroud 26 to function as a stand or base.

In selected embodiments, a shroud 26 may directly connect to and extend from an aperture or conduit forming a low pressure inlet 16. In such embodiments, a shroud 26 may conduct a leak flow directly and exclusively to the low pressure inlet 16.

Alternatively, a shroud 26 may directly connect to and extend from a vortex chamber 12. For example, a shroud 26 may directly connect to and extend from an outer perimeter of a vortex chamber 12. In such embodiments, a shroud 26 may conduct a leak flow exclusively to the low pressure inlet 16. Alternatively, a shroud 26 may conduct a leak flow to a low pressure inlet 16 and one or more high pressure inlets 20. Accordingly, a leak flow may be ingested by a vortex chamber via a low pressure inlet 16, one or more high pressure inlets 20, or some combination thereof.

In selected embodiments, the manner in which a vortex is generated within a vortex chamber 12 may be a deciding factor in determining whether a leak flow is ingested by a vortex chamber 12 via a low pressure inlet 16, a high pressure inlet 20, or both the low pressure inlet 16 and the high pressure inlet 20. In general, a vortex may be generated by injecting a drive fluid into the vortex chamber 12 through a high pressure inlet 20. When such injecting comprised pumping, from a surface vessel or platform, the drive fluid into a high pressure inlet 20, that high pressure inlet 20 may occupied and unable to function as a point where a leak flow may enter a vortex chamber 12.

Alternatively, the drive fluid may comprises ambient water surrounding a vortex device 10 and injecting may comprise driving, by ambient pressure, the ambient water into one or more high pressure inlets 20. For example, in selected embodiments, one or more high pressure inlets 20 may comprise a nozzle wherein ambient pressure is used to inject or drive ambient water into a vortex chamber 12 at a desired (e.g., tangential) orientation and at a desired velocity. When a high pressure inlet 20 is using ambient water as a drive fluid, that high pressure inlet 20 may also function as a point where a leak flow may enter a vortex chamber 12.

Figure 7:
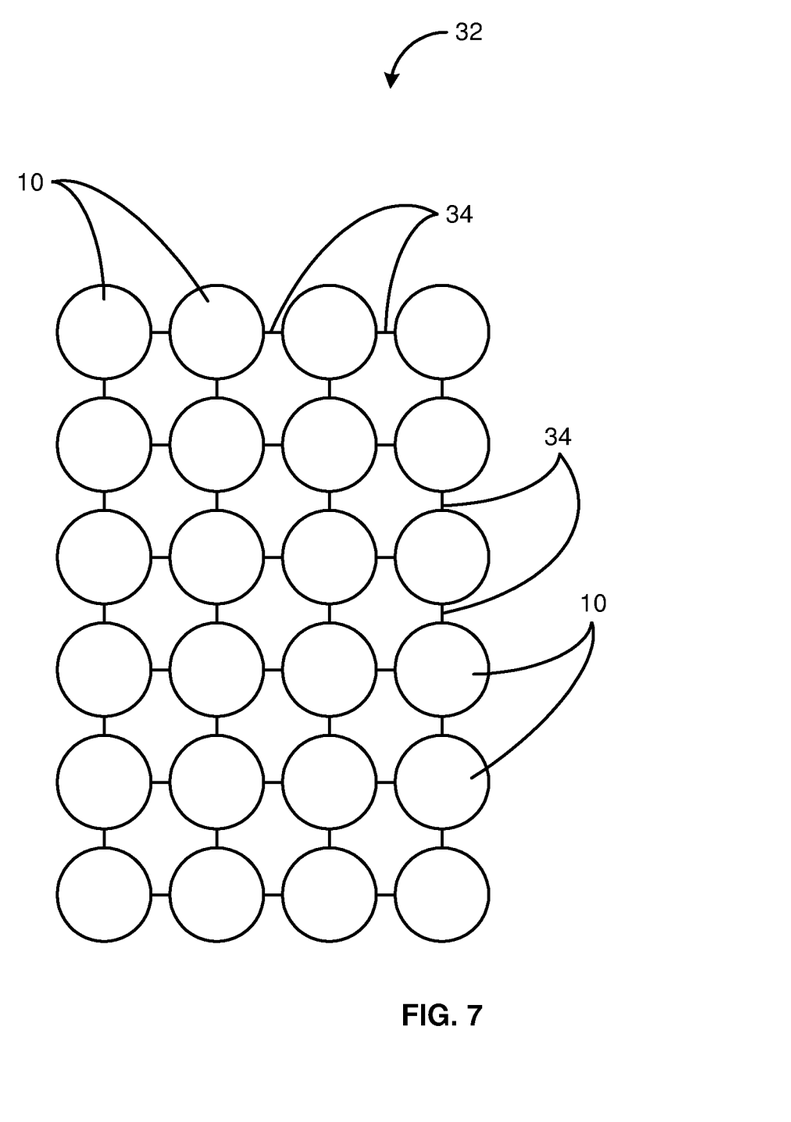
FIG. 7 is a schematic diagram illustrating one embodiment of an array of vortex devices in accordance with the present invention.

Referring to FIG. 7, in certain situations, a leak flow may be distributed over a certain area. For example, an oil or gas leak may be percolating up through the sea floor at multiple points distributed over a certain area. In such situations, it may be advantageous to simultaneously use multiple vortex devices 10 in accordance with the present invention. Accordingly, in selected embodiments, a plurality of vortex devices 10 may be connected together to form a one or two dimensional array 32 of vortex devices 10.

In certain embodiments, each vortex device 10 in an array 32 may be connected to one or more adjacent vortex devices 10 via one or more linkages 34 (e.g., flexible or pivoting tethers 34). Such linkages 34 may comprise chain, cable, rope, two-force members, or the like. The linkages 34 may control or enforce a particular spacing among the individual vortex devices 10 of an array 32.

In such embodiments, each vortex device 10 may function as set forth hereinabove and be responsible for collecting a particular leak flow, all leak flows within a certain area (e.g., within an area encircled by a corresponding shroud 26), or the like. Thus, an array 32 may collect a leak flow issuing from multiple points or all of leak flows issuing within an area covered by the array 32.

The various conduits corresponding to an array 32 may be individualized, combined, or some combination thereof. For example, in selected embodiments, each vortex device 10 may have separate conduits to and from a surface location to deliver a drive fluid to a high pressure inlet 10, conduct fluid out of a vortex device 10 via a low pressure outlet 18, or the like.

Alternatively, various conduits may be combined or joined. For example, an array 32 may include a manifold connected to a surface location via a single conduit. That manifold may deliver drive fluid to a plurality of conduits that, in turn, deliver the drive fluid to respective high pressure inlets 20 of corresponding vortex devices 10 within the array 32. Alternatively, or in addition thereto, another manifold may combine all fluid collected from multiple vortex devices 10 of an array 32 via the various low pressure outlets 18 thereof.

Figure 8:
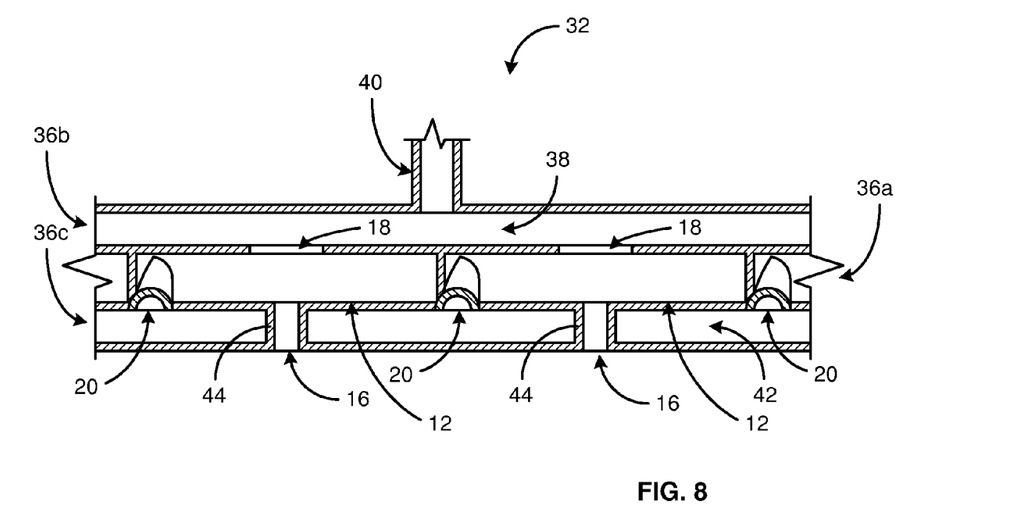
FIG. 8 is a schematic diagram illustrating an alternative embodiment of an array of vortex devices in accordance with the present invention.

Referring to FIG. 8, in selected embodiments, an array 32 may comprise a laminate or multi-layered structure. Different layers 36 of a laminate may perform different functions. For example, a first layer 36a of a laminate may comprise a plurality of vortex chambers 12. Each such vortex chamber 12 may correspond to a different vortex device 10 of the plurality of vortex devices 10 forming the array 32. Regardless of the exterior shape of the first layer 36a, the interior of each vortex chamber 12 corresponding to that layer 36a may be cylindrical or otherwise shaped to support a vortex therewithin.

A second layer 36b of a laminate may comprise a manifold 38 collecting fluid (e.g., fluid comprising a leak flow or some portion thereof) from each low pressure outlet 18 of multiple vortex devices 10 or chambers 12. Accordingly, one conduit 40 may service the manifold 38 (e.g., conduct to a surface location or facility all the fluid collected within the manifold 38). A third layer 36c of a laminate may comprise a manifold 42 distributing a drive fluid to high pressure inlets 20 of multiple vortex devices 10 or chambers 12. The high pressure inlets 20 may then nozzle the drive fluid into corresponding vortex cambers 12 to generate vortices therewithin. Accordingly, the second and third layers 36b, 36c may support proper functioning of the first layer 36a.

In selected embodiments, a first layer 36a may be positioned between corresponding second and third layers 36b, 36c. For example, a second layer 36b may be positioned above a first layer 36a and a third layer 36c may be positioned below the first layer 36a. Accordingly, in certain embodiments, a low pressure inlet 16 of each vortex device 10 may comprise a conduit 44 extending from the first layer 36a, through the third layer 36c to an ambient environment.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
    identifying an underwater leak issuing a leak flow;
    obtaining a vortex device comprising
        a vortex chamber,
        a high pressure inlet tangentially engaging the vortex chamber,
        a low pressure inlet axially engaging the vortex chamber, and
        a low pressure outlet axially engaging the vortex chamber opposite the low pressure inlet;
    generating a vortex within the vortex chamber;
    ingesting at least a portion of the leak flow into the vortex chamber via the low pressure inlet; and
    conducting, by a conduit, the at least a portion of the leak flow from the low pressure outlet to a surface location.

2. The method of claim 1, wherein the vortex device further comprises a shroud encircling the at least a portion of the leak flow and conducting the at least a portion of the leak flow into the low pressure inlet.

3. The method of claim 2, wherein the shroud directly connects to and extends from an aperture forming the low pressure inlet.

4. The method of claim 2, wherein the generating comprises pumping, from a surface vessel or platform, a drive fluid into the high pressure inlet.

5. The method of claim 2, wherein the generating comprises injecting a drive fluid into the vortex chamber through the high pressure inlet.

6. The method of claim 5, wherein:
    the drive fluid comprises ambient water surrounding the vortex device; and
    the injecting comprises driving, by ambient pressure, the ambient water into the high pressure inlet.

7. A method comprising:
    identifying an underwater leak issuing a leak flow;
    obtaining a vortex device comprising
        a vortex chamber,
        a high pressure inlet tangentially engaging the vortex chamber,
        a low pressure inlet axially engaging the vortex chamber, and
        a low pressure outlet axially engaging the vortex chamber opposite the low pressure inlet;
    generating a vortex within the vortex chamber;
    encircling, by a shroud, the leak flow;
    conducting, by the shroud, the leak flow into at least one of the high pressure inlet and the low pressure inlet;
    ingesting, by the vortex chamber, at least a first portion of the leak flow through the low pressure inlet; and
    conducting, by a conduit, the at least a first portion of the leak flow from the low pressure outlet to a surface location.

8. The method of claim 7, wherein the shroud directly connects to and extends from an outer perimeter of the vortex chamber.

9. The method of claim 7, further comprising ingesting, by the vortex chamber, a second portion of the leak flow through the high pressure inlet.

10. The method of claim 9, further comprising conducting, by the conduit, the second portion of the leak flow from the low pressure outlet to the surface location.

11. The method of claim 10, wherein the generating comprises injecting a drive fluid into the vortex chamber through the high pressure inlet.

12. The method of claim 11, wherein:
    the drive fluid comprises ambient water surrounding the vortex device; and
    the injecting comprises driving, by ambient pressure, the ambient water into the high pressure inlet.

13. A method comprising:
    identifying an underwater leak issuing a leak flow;
    obtaining a plurality of vortex devices connected together to form a two-dimensional array of vortex devices, each vortex device of the plurality of vortex devices comprising
        a vortex chamber,
        a high pressure inlet tangentially engaging the vortex chamber,
        a low pressure inlet axially engaging the vortex chamber, and
        a low pressure outlet axially engaging the vortex chamber opposite the low pressure inlet;
    generating a vortex within each vortex chamber corresponding to the plurality of vortex devices;
    ingesting, by each vortex chamber corresponding to the plurality of vortex devices, at least a portion of the leak flow through a low pressure inlet corresponding thereto; and
    conducting, by one or more conduits, the at least a portion of the leak flow ingested by each vortex chamber from the low pressure outlet corresponding thereto to a surface location.

14. The method of claim 13, wherein each vortex device of the plurality of vortex devices is connected to one or more adjacent vortex devices of the plurality of vortex device via one or more flexible tethers.

15. The method of claim 13, wherein the plurality of vortex devices comprises a laminate.

16. The method of claim 15, wherein a first layer of the laminate comprises a plurality of vortex chambers, the plurality of vortex chambers comprising one vortex chamber corresponding to each vortex device of the plurality of vortex devices.

17. The method of claim 16, wherein a second layer of the laminate comprises a manifold collecting, from the low pressure outlet corresponding thereto, the at least a portion of the leak flow ingested by each vortex chamber of the plurality of vortex chambers.

18. The method of claim 17, wherein a third layer of the laminate comprises a manifold distributing a drive fluid to the high pressure inlet of each vortex chamber of the plurality of vortex chambers.

19. The method of claim 18, wherein the first layer is positioned between the second and third layers.

20. The method of claim 19, wherein the low pressure inlet of each vortex device of the plurality of vortex devices comprises a conduit extending from the first layer, through the third layer, to an ambient environment.

* * * * *